United States Patent

[11] 3,591,773

[72] Inventors John Covell Collier
Farnworth;
David William Rickards, Stanmore, both of, England

[21] Appl. No. 749,712
[22] Filed Aug. 2, 1968
[45] Patented July 6, 1971
[73] Assignee AMP Incorporated
Harrisburg, Pa.
[32] Priority June 27, 1968
[33] Great Britain
[31] 30774/68

[54] CARD READER
4 Claims, 3 Drawing Figs.

[52] U.S. Cl. .......... 235/61.1
[51] Int. Cl. .......... G06k 7/04
[50] Field of Search .......... 235/61.11, 61.111, 61.113; 200/46

[56] References Cited

UNITED STATES PATENTS

| | | | |
|---|---|---|---|
| 1,688,308 | 10/1928 | Harding | 235/61.11 X |
| 3,042,299 | 7/1962 | Sherman | 235/61.11 |
| 3,139,519 | 6/1964 | Reinschmidt, Jr. | 235/61.11 |
| 3,470,360 | 9/1969 | Rust et al. | 235/61.11 |

*Primary Examiner*—Daryl W. Cook
*Attorneys*—Curtis, Morris and Safford, Marshall M. Holcombe, William Hintze, William J. Keating, Frederick W. Raring, John R. Hopkins, Adrian J. La Rue and Jay L. Seitchik

ABSTRACT: A card reader uses a solenoid-operated linkage mechanism to give a greater mechanical advantage to close a card-carrying platform against reading means with an increasing force. The platform is inclined to the plane of the reading means so that on closure the reading means are successively engaged by the card.

Inventor
JOHN COVELL COLLIER
DAVID WILLIAM RICKARDS
By
Adrian J. LaRue Attorney

Inventor
JOHN COVELL COLLIER
DAVID WILLIAM RICKARDS
By
Adrian J. LaRue Attorney

Inventor
JOHN COVELL COLLIER
DAVID WILLIAM RICKARDS
By
Adrian J. La Rue Attorney

CARD READER

This invention relates to card readers of the kind in which information carried by a punched or embossed card is converted into electrical signals.

The term "card" as applied to such card readers not only includes carriers which are made of cardboard or paper but also includes those which have a plastic base.

Basically a card reader uses a series of switches which are opened or closed according to the information at various locations on the card to translate it into the required electrical signals. The switches are operated by sensors which are usually spring loaded and may, in many embodiments, comprise a movable contact part of the switch. Many forms of card reader rely on a set of movable contacts to project through holes in the card to engage with a corresponding set of contacts on the other side of the card. The contacts are brought together by relative movement between the sets of contacts.

With big card readers which include a large number of sensors each carried on a separate spring-loaded arm, the cumulative effects of the springs requires a large pressure to be exerted on the sensor members when reading a card in order to overcome the effect of the springs and to establish good contact between the sets of contacts. This need for a large pressure means that the card reader has to be supplied with a heavily powered closing or actuator mechanism such as a motor or solenoid which consequently makes the overall cost of the reader high. The present invention seeks to provide a card reader which needs a less heavily powered closing mechanism than has hitherto been necessary.

A card reader in accordance with the invention comprises a body part carrying an array of stationary contacts and a corresponding array of mateable movable contacts, each movable contact carrying a spring-biased sensor part located in a general plane, a plate having a card-receiving area positioned adjacent the sensor parts, the plate being movable on operation of an actuator mechanism from a rest position inclined to the general plane of the sensor parts to a read position parallel to the general plane of the sensor parts, the arrangement being such that on moving from the rest to the read position a card in the card-receiving area will successively engage rows of sensor parts in the array with an increasing pressure.

The plate is preferably pivotally connected to the body part at one end of the plate and pressure is applied through a linkage arrangement to the other end of the plate. It is advantageous to use a solenoid as the actuator mechanism and the armature of the solenoid can be pivotally connected to a lever having a pressure member which bears on or adjacent the end of the plate not connected to the body part.

A stepped camming mechanism associated with the linkage arrangement is preferably included and which is adapted to move the plate between read and rest positions and to hold the plate in these positions.

It is preferable that the plate carrying the card is positioned below the frame part so that when the solenoid is deenergized the plate is able to fall freely from its reading position to its rest position. Alternatively, a return spring can be incorporated to return the plate to its rest position. However, if such a spring is used, its characteristics must be carefully chosen to match those of the actuator so that the advantage of constant pressure is not lost by the use of the invention.

In the card-receiving area of the plate, the plate is provided with an array of holes in an insulating material. The positions of the holes in the array correspond to the array of sensor parts connected to the movable contacts. The holes are so dimensioned as to allow the sensor parts to pass freely through holes in the card when an apertured form of card is being used. Adjacent the card-receiving area, stops are positioned on the plate to engage with the body part to limit the movement between the part and the plate. By correctly positioning these stops, they can be used to act as guides and can be employed to ensure that a card is correctly positioned whether it is of the type which is inserted from the front of the reader and is wholly contained within the reader or whether it is of the type in which only a part or stub end is read and which is inserted from the side or the reader.

An object of the invention is to provide a card reader having an inclined card-receiving means which is operated by a solenoid-operated linkage to move the card-receiving means into a reading position to read information of a card positioned in a card-receiving area of the card-receiving means.

Another object is the provision of a card reader which uses a linkage arrangement to move a card-carrying member into a reading position thereby achieving a great mechanical advantage to overcome the spring effects of reading means.

A further object is to provide a card reader having a solenoid-operated linkage system to operate a card-carrying member wherein a small solenoid is used due to the mechanical advantage attained via the linkage system.

An additional object is the provision of a card reader having a solenoid-operated ratchet means operating a cam means to move a card-carrying means to a card-reading position.

A still further object is to provide a card reader wherein a card-carrying member is moved by motive means to a card-reading position to successively read information along the length of a data card.

Still an additional object is the provision of a card reader wherein a card-carrying member is automatically moved to a nonreading position after information has been read out from a card or the card-carrying member remains in a card-reading position until the card-carrying member is released from the card-reading position.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

Two examples of card readers embodying the invention will now be described with reference to the accompanying diagrammatic drawings in which.

Figure 1:
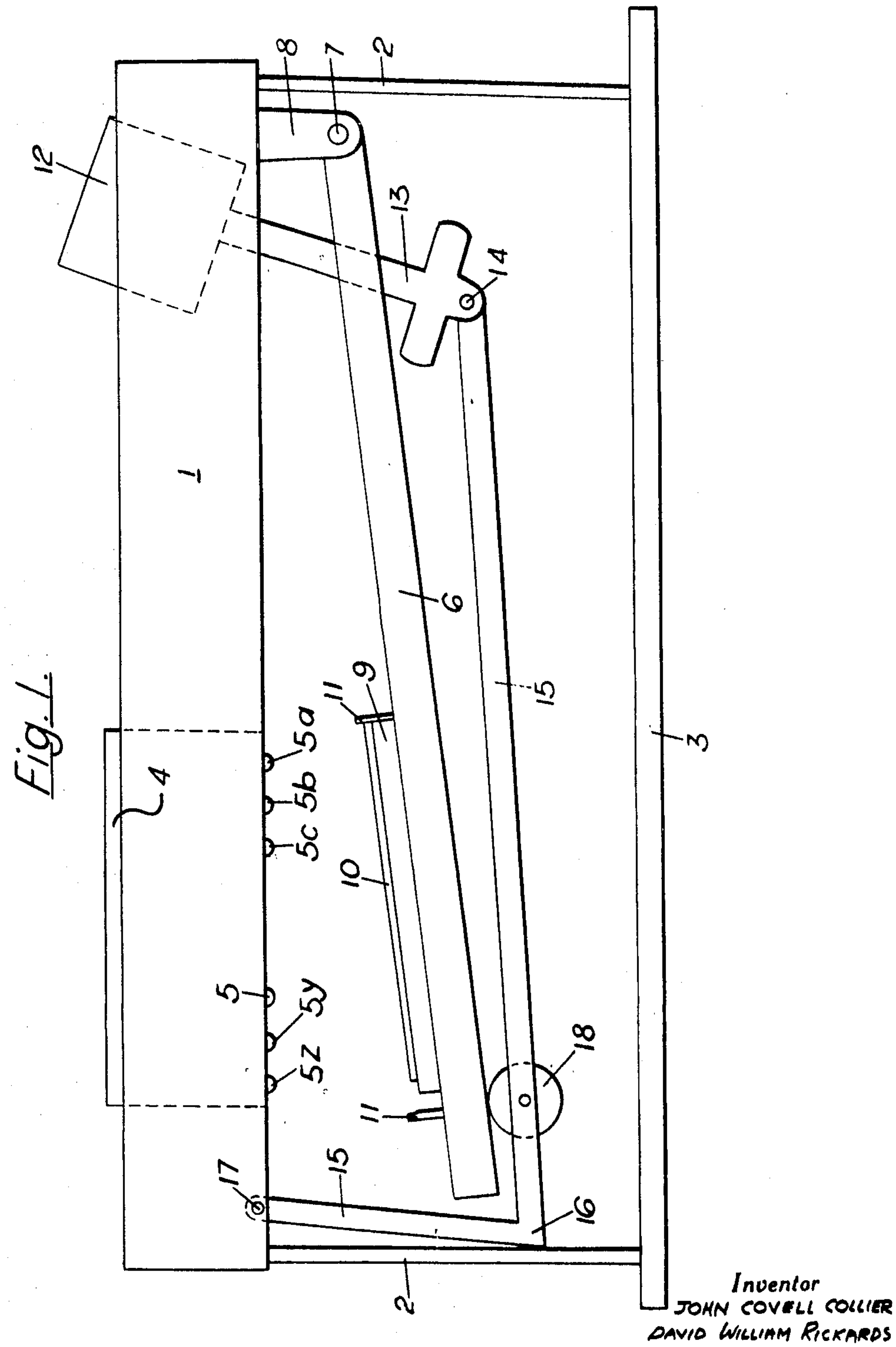
FIG. 1 shows a side view of the essential parts of a first embodiment of a reader.

Referring now to FIG. 1 of the drawings, the card reader comprises a body part 1 in the form of a frame which is supported on support rods 2 connected to a base plate 3. Near its front end, the body part 1 has an array 4 of contacts made up of a plurality of contact assemblies of the interposer kind such as disclosed in U.S. Pat. application, Ser. No. 749,491 filed Aug. 1, 1968. One advantage of using contact assemblies of this kind is that both the movable and the stationary contact parts are contained within a single housing and these housings can all be contained within the frame 1. Thus, all connections can be made to a static part of the reader. The only parts of the contact assembly 4 which extend outside the body part 1 are the sensor parts 5 which project below the lower surface of the frame 1. These sensor parts 5 all lie in a general plane which, in this example, is horizontal.

A plate 6 is positioned below the body part 1 and is pivoted at its rear end by a connecting rod 7 to a pair of lugs 8 extending downwards from the body part 1. Near its front end, the plate 6 has a card-receiving area 9 which comprises a lamina of insulating material having an array of holes punched in it corresponding to the positions of the array of sensor parts 5. A card 10, which carries information in punched hole form which is to be read, is positioned on the area 9. The upper surface of the plate 6 also carries stop members 11 which limit the amount of upward movement of the plate relative to the body part 1. These stop members 11 also act as guides for a card inserted into the reader.

The rear end of the body part 1 also carries an actuator solenoid 12 which is, as shown in the FIG., inclined at an angle to the horizontal. This solenoid 12 has an armature 13 which extends downwardly from the body of the solenoid and which, when the solenoid is energized, is retracted upwards into the body. The free end of the armature 12 has a pivot point 14 to which is connected one arm of a link 15. The link 15 is cranked at 16 and has its other free end pivotally connected at the point 17 to the front of the body part 1. Just rearward of the crank 16, a free running pressure roller 18 is mounted. This pressure roller bears on the underside of the plate 6.

As shown the card reader is in its normal or rest position. When a card 10 is to be read, it is inserted as shown so that it rests on top of the area 9. A switch (not shown) is closed which causes the solenoid 12 to be energized. On energization the armature 13 is retracted into the coil on the solenoid lifting the pivot point 14 towards the solenoid 12. As the pivot point 14 rises, the link 15 pivots about pivot point 17 and raises the pressure roller 18. The pressure roller 18 engages the underneath of the free end of the plate 6 and causes it to pivot upwardly about pivot point 7. The upward movement continues until the stops 11 engage the body part 1.

Since the plate 6 is inclined initially to the body part 1, as the plate is raised the sensor parts 5 will not all be contacted by the card 10 at once. The first row of sensor parts to be contacted will be the rear row indicated as *5a* and then successively the rows *5b*, *5c*, etc. will be closed. When row *5a* is contacted, the solenoid 12 is not producing its maximum effort and will only meet the spring resistance of the spring parts attached to the sensor parts *5a*. When the sensor parts *5b* are contacted, the solenoid will be gathering more power and will be able to overcome the increased spring resistance of *5a* plus *5b*. Similarly, when the third row *5c* of sensor parts is contacted, the greater spring resistance will be met by increasing effort of the solenoid 12. Thus, when the final row of sensor parts *5z* is being contacted, the solenoid will be developing its maximum effort which will be necessary to overcome the total spring resistance of all the springs connected to the various rows of sensor parts.

As soon as the card 10 has been read, the solenoid 12 is deenergized and the armature 13 falls freely downwards. The plate 6 is thus no longer held in its raised position by roller 18 and swings downwards about pivot point 7 to cause the card 10 to disengage from the sensor parts. The card will then be removed and a fresh card put in for reading.

It will be appreciated that one of the advantages of the linkage arrangement is that a great mechanical advantage is achieved by applying through the link 15 and the pressure roller 18 pressure at the free end of the plate 6 and causing it to pivot about the point 7. This means that a relatively small solenoid 12 is able to perform a large amount of work in an efficient manner and also in a cheap manner since a small solenoid is obviously less expensive than a large one. In this example a one inch movement of the armature gives a 0.1 inch movement of the card which is applied to the contacts with an effort ten times that developed by the solenoid. This small solenoid is also sufficient to overcome the forces of the sensor springs since these forces are gradually encountered and their cumulative effects are matched by the power curve of the solenoid.

Figure 2:
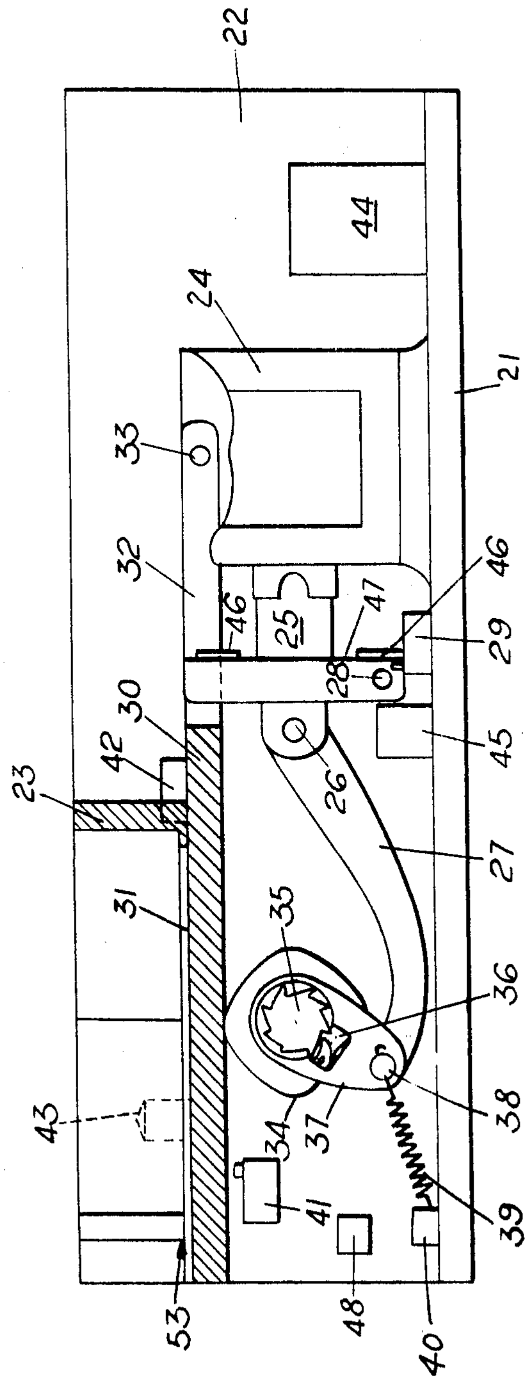
FIG. 2 shows a side view of a second embodiment of a reader.

Referring now to the second embodiment shown in FIG. 2, the card reader comprises a support base 21 carrying two parallel spaced side walls 22 of which only one is shown, the other being removed for ease of illustration. A contact assembly head 23 is supported in a body part between the tops of the side walls 22 adjacent the front of the reader and this head comprises an array of 80×12 electrical contacts and associated sensor members corresponding to the array of contact assembly 4 of FIG. 1. A solenoid 24 having an armature 25 arranged to move parallel to the base 21 is secured to this base 21. At its free end, the armature 25 carries a pivot point 26 connected to a link arm 27, and also carries a rod 28 extending outwardly towards the side walls for operating a stop microswitch 29.

A card-receiving plate 30 is located below the head 23 and has a card-receiving area 31 corresponding to the area 11 of FIG. 1 on its upper surface. The plate 30 is supported by two arms 32 extending rearwardly and pivotally secured at 33 to the sidewalls 22, and by a cam member 34 bearing on the underside of the plate. The cam member 34 has a ratchet 35 formed on one side face and this ratchet is engaged by a spring-loaded pawl 36 carried in a pawl support 37 attached to the link arm 27. A pivot point 38 between the pawl support 37 and the link arm 27 is attached to one end of a return spring 39, the other end of which is attached at 40 to the base 21.

A plate-operated microswitch 41 is positioned below the plate 30 in such a position that when the plate is in its lower or rest position as shown the plate bears on the switch and holds it in its normally closed condition and that when the plate 30 is moved to its upper or reading position the switch changes over to an open condition. A card-operated microswitch 42 is also provided and is located at the back of the card-receiving area 31. Microswitch 42 is normally open and is closed when a card is fully inserted in the correct position in the card-receiving area 31.

In order to assist in moving the plate 30 from its reading to its nonreading position, a compression return spring 43 is incorporated in the head 23 to bear on the plate 30. The characteristics of spring 43 are carefully chosen so that the spring is lightly loaded and does not require a large amount of power from the solenoid to be exerted to overcome its forces. The solenoid 24 is not directly energized but receives its current through the actuation of a solenoid operated relay 44. The armature 25 is limited in its outward movement, which is influenced by spring 38, by a rubber buffer 45. Rubber stop buffers 46 are also placed on a surface 47 of the armature to limit shock and vibration when solenoid 24 operates.

Figure 3:
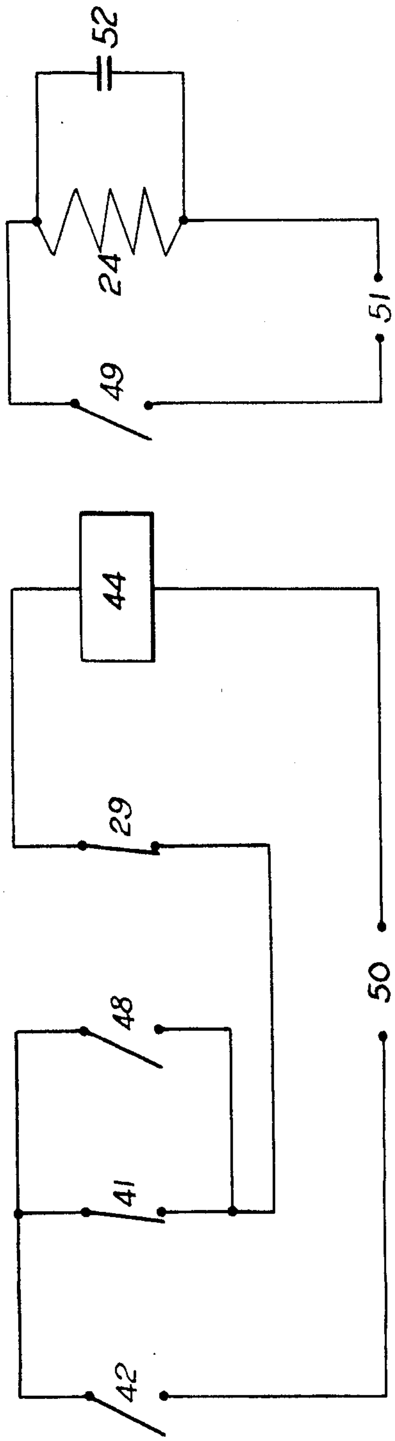
FIG. 3 shows a circuit arrangement of the reader of FIG. 2.

In FIG. 3, to which reference is now also made, the electrical circuit of the card reader is shown. It will be seen that two series circuits are involved, the first, a control circuit, is connected across a low direct voltage supply source 50 and comprises the card-operated microswitch 42 in series with a parallel circuit comprising the plate operated microswitch 41 and a manually operated normally open restart microswitch 48. The other side of this parallel circuit comprises the stop microswitch 29 and the coil of relay 44. The second series circuit comprises contacts 49 of relay 44 connected on one side to a power supply 51 and on the other side to the coil of solenoid 24 which is also connected to supply 51. A spark-quenching capacitor 52 is connected across the solenoid coil.

In operation the card reader is in its open or rest position with plate 30 lowered and resting on one of the four flat surfaces of cam 34. The microswitch 41 is held closed by the pressure of the plate 30. A card is now inserted into the card-receiving area in the direction indicated by arrow 53. Polarizing means, not shown, ensure that the card is presented in the correct position in the card-receiving area 31. As the card reaches the end of the area, it engages a spring-loaded operating arm of microswitch 42 and closes the microswitch. As can be seen from FIG. 3, the closing of switch 42 completes the supply circuit to the coil of relay 44 through microswitches 42 and 29 which are already closed. The relay 44 operates to close contacts 49 which causes solenoid 24 to be energized from supply 51.

As soon as solenoid 24 is energized, its armature 25 is attracted into the body of the coil of the solenoid 24. As the armature 25 moves towards the coil, the rod 28 engages an operating arm of microswitch 29 when the armature has completed about one third of its travel. This engagement opens microswitch 29 thus breaking the supply to relay 44 causing contacts 49 to open and solenoid 24 to be deenergized. The armature 25 will have sufficient inertia that, despite that fact that solenoid 24 is deenergized, it will complete its travel into the coil of solenoid 24. In doing so link 27 is moved to the right in FIG. 2 causing pawl support 37 to rotate against the action of spring 38. As pawl support 37 rotates, the pawl 36 engages in a tooth of ratchet 35 and moves it and the cam 34 through one tooth pitch of ratchet 35. The armature 25 has now completed its travel and lost its initial inertia and is now returned to its original position under the influence of return spring 38.

When the cam 34 is turned through one tooth pitch of ratchet 35, a high point of the cam lifts the plate 30, rotating it about pivots 33, to a reading position where the sensor members of the head 23 interrogate the card and operate the contacts of the heard in accordance with data contained on the card. As the plate 30 rises, it releases the microswitch 41 which opens so that the relay 44 is not reenergized when the armature returns to its original position and the microswitch 29 is reclosed. The cam 34 now remains in its new position and the reader thus stays in its operated position. It will be appreciated that this position is held although solenoid 24 is no longer energized. As the reader may be used in locations where it is desirable to hold the reader closed for long periods, the necessity, which is apparent in prior art card readers, for the solenoid to be continually energized is removed. This means that a cheaper and smaller solenoid is able to be used than would otherwise be the case since the solenoid need only be short rated instead of continuously rated. The size of the solenoid is even further reduced by the operation of the microswitch 29 causing the solenoid 24 to be deenergized during its working stroke. Since the solenoid is operated for such a short period, a small solenoid can be used which can be overrun without detriment.

When reading is completed and it is wished to release the card, the microswitch 48 is manually operated by depressing a pushbutton, not shown, which projects through the sidewall 22 of the reader. As can be seen from FIG. 3 when microswitch 48 is closed, the second branch of the parallel circuit is used to complete the series circuit to energize relay 44 and hence solenoid 24. Solenoid 24 operates as before moving cam 34 through one tooth pitch of ratchet 35. The plate now rests on a low point of the cam 34 and spring 43 urges plate 30 downwards. As the card is no longer trapped in the card receiving area 31, the spring of the card-operated microswitch 43 ejects the card from the reader and at the same time opens switch 42. The opening of this switch 42 means that even if switch 48 is held closed the solenoid 24 will not be energized and recycled. As the plate 30 is lowered, microswitch 41 will be reclosed ready for the next reading operation.

The cam 34 may be operated by a face-engaging ratchet or alternatively by a spring or other clutch mechanism. The cam is preferably arranged so that with the reader in the reading or closed position the cam has gone just over the high point and rests at a point where the cam is beginning the return stroke of the plate 30. This ensures that, at the beginning of the next stroke of the armature 25, the cam 34 does not have to act against the action of the springs in the card reader head 23.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention I claim is in accordance with the following:

1. A card reader comprising an array of stationary contacts and a corresponding array of mateable movable contacts, each movable contact carrying a spring biased sensor part located in a general plane, a plate having a card-receiving area positioned adjacent the sensor parts, an actuator mechanism operatively connected to said plate to move said plate from a rest position inclined to the general plane of the sensor parts to a read position parallel to the general plane of the sensor parts, the actuator mechanism comprising a solenoid arranged to act on the plate, and linkage means disposed between said plate and said solenoid, the linkage means being connected to a stepped camming mechanism having a camming surface adapted to bear against the plate and to move it between the rest and read positions, said plate on moving from the rest to the read position with a card (10) in the card-receiving area successively engages rows of sensor parts in the array with an increasing pressure.

2. A card reader as claimed in claim 1, wherein the camming mechanism includes means adapted to move the camming surface between alternate extreme positions on each operation of the solenoid and to retain the camming surface in that position until a subsequent operation of the solenoid.

3. A card reader as claimed in claim 2, wherein the means adapted to move the camming surface comprises a pawl and ratchet arrangement.

4. A card reader as claimed in claim 1 and including a return spring to reset the solenoid at the completion of an operation of the solenoid.